United States Patent [19]
Stone

[11] 3,901,127
[45] Aug. 26, 1975

[54] MECHANISM FOR POSITIONING A WORK PIECE

[76] Inventor: Edward P. Stone, 4362 Whittle Ave., Oakland, Calif. 94602

[22] Filed: Nov. 19, 1973

[21] Appl. No.: 417,422

[52] U.S. Cl.............. 90/58 R; 51/217 R; 269/71; 408/234
[51] Int. Cl............................................. B23d 7/08
[58] Field of Search................. 90/58 R, 58 A, 16; 51/217 R, 217 A, 218 R, 218 A, 225; 408/69, 234; 82/24; 269/71, 73

[56] References Cited
UNITED STATES PATENTS

| | | | |
|---|---|---|---|
| 2,782,661 | 2/1957 | Lewis | 90/58 X |
| 3,148,873 | 9/1964 | Chandler | 269/71 |

FOREIGN PATENTS OR APPLICATIONS

| | | | |
|---|---|---|---|
| 7,898 | 6/1902 | Germany | 82/24 |
| 693,689 | 7/1953 | United Kingdom | 51/225 |
| 41,213 | 1965 | Germany | 82/24 |
| 15,587 | 7/1892 | United Kingdom | 51/225 |

*Primary Examiner*—Gil Weidenfeld
*Attorney, Agent, or Firm*—Esq. Gardner; Theodore J. Bielen, Jr., Esq.; Richard Esty Peterson, Esq.

[57] ABSTRACT

Disclosed is a work table mechanism for a power tool assembly. The work table mechanism is effective to position a work piece carried thereby relative to the tool or material-processing element of the tool assembly very accurately by displacements in directions normal to each other along a rectangular coordinate system. The tool assembly includes a generally vertical standard, and the work table mechanism has a base that is disposed along a horizontal plane and is carried by the standard for vertical adjustments therealong. The mechanism further provides a work table supported upon the base in an orientation relative thereto such that elongated tracks respectively provided thereby are disposed in facing relation and with axes of reciprocation therealong disposed at generally right angles to define a rectangular or cartesian coordinate system. Each track is in the form of a dovetail recess or mortise, and a connecting block of trapezohedral configuration defining two dovetail or flaring tenons respectively disposed within the tracks interlockingly engage the base and work table while accommodating displacements of the latter relative to the base along each axis. Lead screws interconnecting the block with the base and work table are operative to effect selective displacements of the latter along the axis to locate the work table and any work piece clamped thereto very accurately along the coordinate system for engagement with a material-processing implement provided by the tool assembly.

10 Claims, 9 Drawing Figures

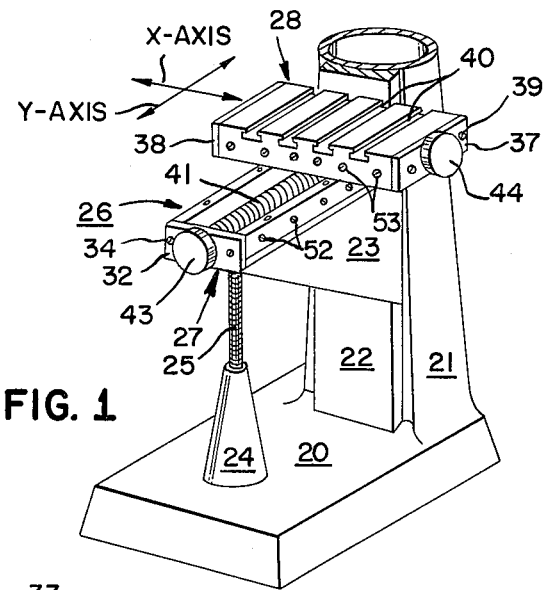
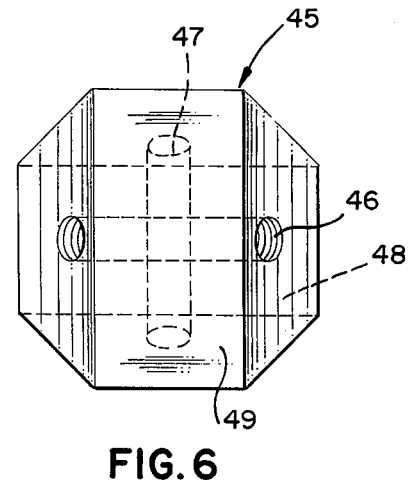
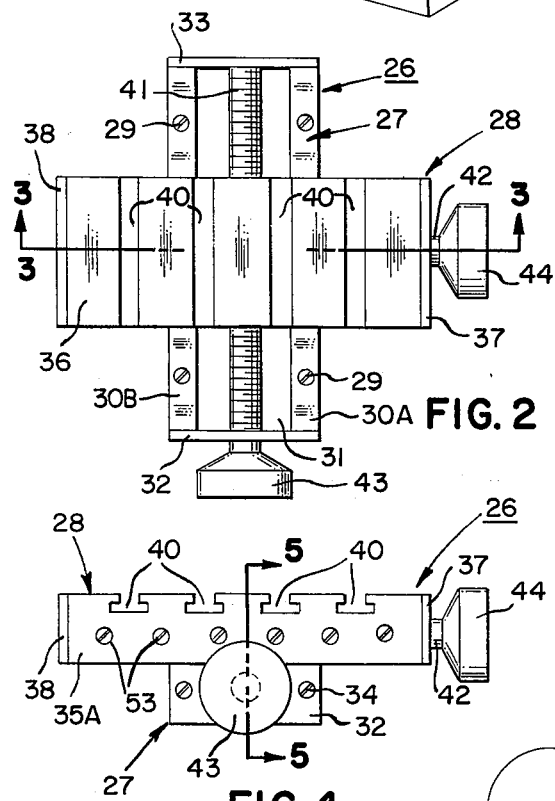
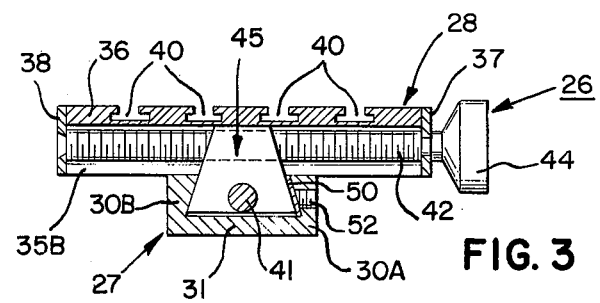
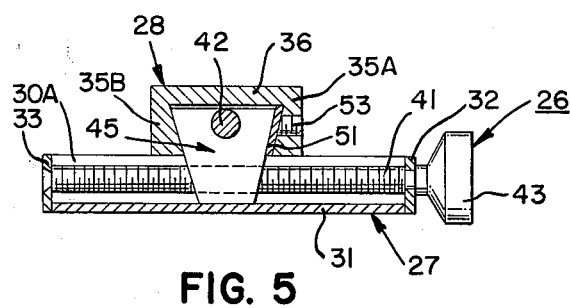
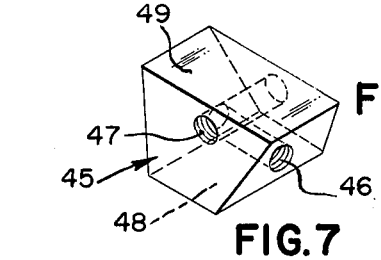
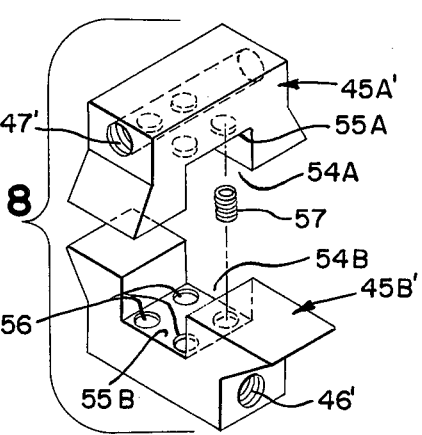
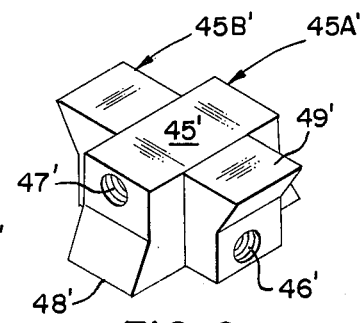

MECHANISM FOR POSITIONING A WORK PIECE

BACKGROUND OF THE INVENTION

In using power tools such as drill presses and milling machines, it is desirable to fix the piece upon which work is to be performed, hereinafter called the "work piece," firmly to a work table. A work table in the context of this invention means a component that is a part of the power tool assembly and that is provided to hold the work piece in a position such that the material-processing elements of the tool assembly can functionally engage the same. The work table may be specially adapted with grooves or slots to receive clamps or other conventional fastener means for holding the work firmly in position on the component. The work table is arranged so that it can be displaced together with supports therefor in directions enabling the work piece to be accurately located with respect to the tool or material-processing implement of the tool assembly so that the requisite drilling or cutting operations can be performed thereby upon the work piece.

In machine tool assemblies of the type being considered, the work piece can be positioned at any location along a plane (within the limits of adjustment defined by any particular tool assembly) by displacing the work piece as necessary along two intersecting axes of a coordinate system which practicably is a rectangular or cartesian coordinate system. Heretofore, the mechanical assemblage by means of which the work piece, which is clamped or otherwise fixedly secured to a work table, is displaceable along the axes of the coordinate system has been relatively complex and has included at least a stationary base, a table movable along one of the coordinate axes, another table movable along the outer coordinate axes, and means interconnecting such tables with the base to accommodate the required movements. Such mechanical complexity also makes reconditioning of the work table mechanism both inconvenient and expensive as well as making the initial cost of the mechanism quite high because of the number of the parts involved and because of the requirement for accurate machining within very close tolerances of the many functionally interrelated parts.

SUMMARY OF THE INVENTION

This invention relates to work table mechanisms for power tool assemblies and, more particularly, to an improved and structurally simplified work table mechanism for machine tools such as drill presses, milling machines and the like.

In this respect, the invention provides a structurally simplified and effective means for moving the work table of a power tool assembly with respect to the materialprocessing tool implement thereof to position accurately with respect thereto a work piece fixed to the movable table. The work table mechanism of the present invention includes a base and a work table each providing an axis of reciprocation therealong. The base is a stationary component as respects the work table mechanism, but it may be supported by a generally vertical or upright standard provided by an associated tool assembly for adjustable displacement therealong. The work table is movable relative to the base and is supported thereby in an orientation such that the axes of reciprocation are disposed at essentially right angles to establish a cartesian or rectangular coordinate system. In this context, the two axes respectively defined along the movable work table and stationary base may be referred to hereinafter, respectively, as the "x-axis" and the "y-axis."

The base and work table are provided with facing tracks respectively disposed along the coordinate axes, and each track may be in the form of a dovetail recess or mortise. A connecting block having portions thereof disposed within the tracks interlockingly engages the latter but is movable relative to each track along the axis thereof. The connecting block, which may be taken to be in the general or approximate form of a trapezohedran although each of the six faces thereof need not be trapezoidal, defines two dovetail or flaring tenons respectively disposed within the tracks to establish the interlocking engagement therewith. Lead screw means interconnects the block with the base and work table to effect selective displacements of the latter along the coordinate axes and thereby position a work piece clamped or otherwise fixedly related to the work table at any particular location along the rectangular coordinate system defined by the $x$ and $y$ axes.

The work table mechanism further includes means for developing a predetermined frictional inhibition against free or loose interconnection between the block and respective tracks for the purpose of enhancing the accuracy of location of the work piece relative to the tool or materialprocessing implement of the associated machine tool assembly. Such means may take the form of gibs interrelating the connecting block with each of the associated tracks, and in certain forms of the invention it may take the form of spring structures associated with a split or sectioned connecting block which, in association, are effective to automatically provide the desired frictional inhibition and to accommodate any wear that may develop between the connecting block and track surfaces.

In addition to the general objects of mechanical simplification, convenience in reconditioning, and general reduction in expense as well as improved performance, additional objects and advantages of the invention especially as concerns particular features and characteristics thereof will become apparent as the specification continues.

DETAILED DESCRIPTION OF THE INVENTION

Embodiments of the work table mechanism of the present invention are illustrated in the accompanying drawing which is intended to be illustrative rather than limiting in scope, and in which:

FIG. 1 is a broken perspective view of a machine or power tool assembly embodying the present invention;

FIG. 2 is a top plan view of the work table mechanism illustrated in FIG. 1;

FIG. 3 is an axial sectional view taken along the line 3—3 of FIG. 2;

FIG. 4 is an end view in elevation of the work table mechanism illustrated in FIG. 2;

FIG. 5 is an axial sectional view taken along the line 5—5 of FIG. 4;

FIG. 6 is a top plan view of the connecting block;

FIG. 7 is a perspective view of the connecting block;

FIG. 8 is an exploded perspective view of a modified connecting block; and

FIG. 9 is a perspective view of the modified connecting block shown in FIG. 8 but in the assembled condition thereof.

Reference will first be made to FIG. 1 which illustrates a portion of a machine or power tool assembly which, to a great extent, may be completely conventional and for specific identification, may be taken to be a drill press. The machine tool illustrated includes a platform 20 supporting an upright or generally vertical standard 21 having along the front face thereof a dovetail element 22 adapted to cooperatively engage a horizontal support 23. The support 23 extends outwardly from the dovetail 22, and it is supported adjacent its outer end by an adjustable post structure having a threaded sleeve 24 rotatably supported by the platform 20 and which, when rotated, causes a threaded rod 25 received therein to extend therefrom or retract thereinto, thereby adjusting the vertical position of the horizontal support 23. The sleeve 24 and rod 25 exemplify one means of adjusting the vertical position of the horizontal support 23, and such adjustment means together with the base, standard, dovetail and support may be completely conventional and per se form no part of the present invention. As respects conventionality, it will be apparent that the base or rear end portion of the arm 23 is equipped with a dovetail recess or mortise within which the dovetail or flaring tenon 22 seats to interconnect the arm therewith and accommodate vertical displacements of the latter.

Work table mechanism embodying the present invention is denoted generally with the numeral 26, and it includes both a base 27 and a work table 28, the first of which is fixedly secured to the support arm 23 in any suitable manner as, for example, by means of screw fasteners extending through openings 29 provided therefor in the base 27. In this respect, the base 27 includes a pair of transversely spaced and substantially parallel rails 30A and 30B connected integrally or otherwise at their lower extremities by a transversely extending web 31. The base 27 is equipped at the opposite ends thereof with end plates 32 and 33 which may be fixedly secured thereto by a plurality of screw fasteners 34, as shown in FIGS. 1 and 4, that extend through the end plates and into threaded openings provided therefor in the rails 30.

The work table 28 is supported, at least in part, by the base 27 and, in the particular embodiment of the invention being considered, is supported upon the base in overlying relation therewith. As is most evident in FIG. 5, the table 28 is provided with a pair of transversely spaced and substantially parallel rails 35A and 35B interconnected adjacent the upper extremities thereof by a transversely disposed web 36 which may be formed integrally with the rails, as shown. End plates 37 and 38 form a part of the table 28, and they are fixedly connected to the rails 35 by means of a plurality of screw fasteners 39, as shown in FIG. 1. The web 36 of the table 28 is relatively planar, but it may be provided therealong with means for clamping or otherwise fixedly securing a work piece (not shown) thereto. In this respect, a plurality of conventional T-shaped slots or channels 40 are provided therealong in axially spaced and transversely extending relation. The slots 40 are generally parallel, and constitute conventional means for securing work pieces to the movable table component of machine tools.

The base 27 and work table 28 are inverted relative to each other so that the rails 30 and 35 thereof are in facing relation, and they are provided with facing tracks respectively defined between the associated rails 30A, 30B and 35A, 35B the centerlines of which define or establish the axes of a cartesian or rectangular coordinate system. As noted hereinbefore, such axes may be referred to conveniently as the $x$ or $y$ axes, and in FIG. 1 the intersecting lines of motion of the movable table 28 are so designated. Thus, the $x$ axis is established along the track of the movable table 28, and the $y$ axis is defined along the track of the base 26. The $y$ and $x$ axes are respectively located adjacent the centerlines of the base 27 and table 28 and, more particularly, along the axes of lead screws 41 and 42 respectively associated with the base and table. The lead screws are supported for rotation by the respectively associated end plates 32, 33 and 37, 38 but are constrained against bodily displacements relative thereto, and such lead screws are respectively equipped with hand wheels or knurled knobs 43 and 44 to facilitate rotation thereof for manual adjustment of the work table mechanism.

The facing tracks respectively provided by the base 27 and table 28 are of dovetail cross-section, as seen best in FIGS. 3 and 5, and in more particular terms, the rails are inclined outwardly or transversely toward the associated webs to define dovetail recesses or mortises. The dovetail tracks cooperate with a connecting block 45 having portions thereof disposed within the tracks to interlockingly engage the same and, at the same time, to accommodate relative axial displacements between the block and each of the base and table components. In this respect, the connecting block 45 has a double dovetail configuration to define a dovetail or flaring tenon along each of the coordinate axes defined by the base and table components. The connecting block 45 is cooperatively associated with the lead screws 41 and 42 so as to be adjustably interconnected thereby with the base and table. For this purpose, and as shown best in FIGS. 6 and 7, the block 45 is provided with a pair of threaded passages 46 and 47 therethrough oriented along the $y$ and $x$ axes, respectively, and threadedly engaging the lead screws 41 and 42, as illustrated in FIGS. 3 and 5.

In more particular terms, the connecting block 45 is a six-sided polydedron essentially trapezohedral in configuration in that four of the six sides are trapezoidal and the other two sides, which are opposite each other, are rectangular. Rectangular sides or faces are rspectively denoted with the numerals 48 and 49, and they are respectively disposed in facing relation with the webs 31 and 36. The narrow ends of these rectangular faces 48 and 49 flare outwardly to establish the tenons that cooperatively engage the mortises provided by the tracks of the base and table components, and thereby interconnect the movable table with the base while accommodating selective axial displacements of the table relative to the base along the $x$ and $y$ axes of the coordinate system.

For purposes of avoiding slack or looseness in the interconnection of the block 45 with both the base 27 and table 28, means are included to compensate for any initial looseness or that which may develop because of wear between the cooperative surfaces, and to apply a predetermined frictional inhibition to free relative movement between the cooperative surfaces. In the form of the invention illustrated in FIGS. 1 through 7, such means takes the form of friction inserts in the character of gibs 50 and 51, as illustrated in FIGS. 3 and 5, which respectively extend along the rails 30A and 35A of the base and table components. The gibs 50 and 51 are therefore slidably engaged by the contiguous surfaces of the block 45, and the degree of frictional inhibition to relative movement enforced upon the block is determined by plurality of gib-adjusting screws 52 and 53 that respectively extend through the associated rails 30A and 35A, as illustrated in FIGS. 1 and 3 through 5. It will be apparent that as the adjusting screws 52 and 53 are turned inwardly, the respectively associated gibs 50 and 51 will be pressed into tighter frictional engagement with the connecting block 45, and vice versa. The gibs 50 and 51 may be made of any suitable material as, for example, a metal such as brass or bronze that is somewhat softer than the machine steel comprising the block 45, base 27, and table 28 so that most of the wear will occur along the gibs which are readily replaceable when necessary.

A modified connecting block 45' is illustrated in FIGS. 8 and 9, and it is particularly desirable in that it automatically takes up slack or looseness and similarly accommodates wear automatically. The block 45' consists of a plurality (two in the particular form shown) of individual and separate segments 45A' and 45B' which may be substantially identical, as is most evident in FIG. 8. The block segments 45A' and 45B' are somewhat U-shaped in configuration, and they are accordingly provided with cutouts 54A and 54B that respectively terminate in inner surfaces 55A and 55B each of which is provided with a plurality of openings 56 adapted to seat helical compression springs 57 therein. It will be apparent that when the segments are interfitted, as shown in FIG. 9, the springs 57 will tend to resiliently bias the segments away from each other so as to separate the facing inner surfaces 55A and 55B.

The connecting block 45' is provided with a double dovetail or flaring tenons in the general manner of the block 45 heretofore described, and in this respect, the modified block 45' has a generally rectangular bottom surface 48' constituted in part by the downwardly facing surfaces of the legs of the U-shaped block segment 45A' and in part by the generally planar downwardly facing surface of the crossbar or base of the U-shaped block segment 45B'. Apparently, then, the bottom surface 48' is only an approximation to a rectangular configuration in the sense that the four corner portions thereof are absent because of the particular configuration of the block segments 45A' and 45B'. It is apparent in FIG. 9 that the top surface 49' is also an approximation to a generally rectangular configuration in that it has geometric identity with the bottom surface 48'.

The bottom wall 48' flares outwardly at opposite ends thereof to establish tenons adapted to cooperatively engage the mortise provided by the tracks of the base 27 in the case of the modified block 45' being substituted for the prior-described block 45; and the topwall 49' similarly flares outwardly at opposite ends thereof to establish tenons for cooperative engagement with the mortise provided by the tracks of the table component 28 should the block 45' be used therewith. It will be evident that the tenons defined by the bottom wall 48' are disposed at right angles with respect to the tenons provided by the topwall 39', and when the block 45' is used, such tenons interconnect the movable table with the base while accommodating selective axial displacements of the table relative to the base along the x and y axes of the coordinate system. The block segments 45A' and 45B' are respectively provided with threaded passages 47' and 46' therethrough oriented along the coordinate axes and adapted to engage the lead screws 41 and 42 for the purpose of enforcing the desired rectilinear movements on the table 28, as previously described.

The modified connecting block 45' may be taken to be generally polyhedral in the sense that the tenon-equipped ends of the block segments 45A' and 45B' could be configurated and join along angularly disposed lines in the manner of the block 45 shown in FIG. 7. Correspondingly, the block 45 could be modified structurally to approximate the stepped configuration of the modified block 45'. The outwardly flared tenons of the modified block 45' initiate approximately midway between the bottom and top surfaces 48' and 49' which in vertical dimensions corresponds to the depths of the mortises defined by the tracks of the base 27 and platform 28. Irrespective of its particular configuration, the modified connecting block 45' when incorporated in a structural assemblage with the base 27 and platform 28 functions in the same manner as the connecting block 45, all as previously explained. The resilient biasing force of the springs 57 tending to separate the block segments 45A' and 45B' imposes a frictional interconnection of the tenons of the connecting block with the mortises of the base and platform tending to remove slack from the system and obviating the requirement for gibs 50 and 51 in the embodiment of the invention utilizing the connecting block 45.

While in the foregoing specification, an embodiment of the invention has been set forth in considerable detail for purposes of making a complete disclosure thereof, it will be apparent to those skilled in the art that numerous changes may be made in such details without departing from the spirit and principles of the invention.

What is claimed is:

1. Work table mechanism for a power tool assembly comprising: a base and work table each providing an axis of reciprocation therealong; said work table being supported by said base and oriented with respect to said base such that said axes of reciprocation are disposed at essentially right angles; said base and work table being provided with oppositely facing tracks respectively disposed along said axes and said tracks being in abutting relationship with each other; a connecting block substantially completely disposed within said tracks and interlockingly engaging the same, said block being movable relative to said base along the axis thereof; and lead screw means interconnecting said block with said base and work table to effect selective displacements of the latter along said axes and thereby position a work piece fixedly related to said work table at any location along a rectangular coordinate system defined by said axes.

2. The work table mechanism of claim 1 in which each of said tracks defines a mortise, and said connecting block is equipped with oppositely facing pairs of tenons respectively disposed in sliding engagment with said mortises.

3. The work table mechanism of claim 2 in which said block and work table are constrained for concurrent movement relative to said base along one of said coordinate axes, and in which said work table is movable relative to said block and base along the other coordinate axis.

4. The work table mechanism of claim 1 in which said connecting block is generally trapezohedral in configuration.

5. The work table mechanism of claim 4 in which said connecting block has four generally trapezoidal sides and two generally rectangular sides.

6. The work table mechanism of claim 5 in which each of said tracks defines a mortise, and said connecting block defines tenons along the generally rectangular sides thereof slidably engageable with said mortises to define the aforesaid interlocking engagement of said block with said tracks.

7. The work table mechanism of claim 6 and further including adjustable gib members cooperatively arranged with said mortises and tenons to provide a frictional inhibition preventing looseness in the inner engagement of said tenons with said mortises.

8. The work table mechanism of claim 1 in which said connecting block comprises a pair of complementary block segments displaceable with respect to each other along an axis generally normal to the aforesaid coordinate axes, and further comprising means biasing said block segments toward relative movement along such normal axis to provide a frictional inhibition against movement of said connecting block relative to said base and work table.

9. The work table mechanism of claim 8 in which each of said tracks defines a mortise, and in which each of said block segments defines a tenon slidably engageable with the mortise associated therewith, said lead screw means including a pair of lead screws respectively associated with said base and work table, and in which each of said block segments is provided with a threaded passage therethrough cooperative with one of said lead screws to effect the aforesaid interconnection of said lead screw means with said base and work table.

10. The work table mechanism of claim 9 in which each of said block segments is generally U-shaped in configuration and provides facing interior surfaces respectively equipped therealong with spring seats, and in which said biasing means includes compression springs respectively disposed within said seats so as to be confined within the composite connecting block defined by said block segments.

* * * * *